(12) United States Patent
Hataita et al.

(10) Patent No.: US 10,309,810 B2
(45) Date of Patent: Jun. 4, 2019

(54) PRESSURE TYPE FLOWMETER

(71) Applicant: HORIBA STEC, Co., Ltd., Kyoto-shi, Kyoto (JP)

(72) Inventors: Takehisa Hataita, Kyoto (JP); Hideaki Miyamoto, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 15/814,041

(22) Filed: Nov. 15, 2017

(65) Prior Publication Data

US 2018/0136021 A1 May 17, 2018

(30) Foreign Application Priority Data

Nov. 17, 2016 (JP) .................................. 2016-224246

(51) Int. Cl.
| | |
|---|---|
| *G01F 1/38* | (2006.01) |
| *G01F 1/36* | (2006.01) |
| *G01L 9/00* | (2006.01) |
| *G01L 15/00* | (2006.01) |
| *G01L 13/06* | (2006.01) |

(52) U.S. Cl.
CPC ................ *G01F 1/383* (2013.01); *G01F 1/36* (2013.01); *G01L 9/0072* (2013.01); *G01L 13/06* (2013.01); *G01L 15/00* (2013.01)

(58) Field of Classification Search
CPC ......... G01F 1/383; G01F 1/37; G01L 9/0072; G01L 9/12
See application file for complete search history.

(56) References Cited

U.S. PATENT DOCUMENTS 4,141,252 A * 2/1979 Lodge ................. G01L 19/0092
73/724
5,022,270 A 6/1991 Rud, Jr.
(Continued)

FOREIGN PATENT DOCUMENTS

JP 2008196858 A 8/2008

OTHER PUBLICATIONS

European Patent Office, Extended European Search Report Issued in Application No. 17001857.6, dated Apr. 10, 2018, Germany, 7 pages.

*Primary Examiner* — Jewel V Dowtin
(74) *Attorney, Agent, or Firm* — Alleman Hall Creasman & Tuttle LLP

(57) ABSTRACT

In order to solve a problem occurring in a capacitance type pressure sensor adapted to measure absolute pressure, and thereby reduce error, a pressure type flowmeter includes a fluid resistance part in a flow path through which fluid flows and measures a flow rate by detecting the upstream and downstream pressures of the fluid resistance part. Respective pressure sensors for detecting the upstream and downstream pressures are configured to be gauge pressure sensors. Each of the gauge pressure sensors is a capacitance type pressure sensor adapted to measure gauge pressure by detecting a change in the capacitance between a diaphragm displaceable by pressure and a fixed electrode and has a main body part that supports the fixed electrode and the diaphragm and forms a space between them. Further, the internal space is adapted to communicatively connect to the outside through a communicative connection part.

5 Claims, 6 Drawing Sheets

(56) References Cited

U.S. PATENT DOCUMENTS

| | | | | |
|---|---|---|---|---|
| 5,672,832 | A | * | 9/1997 | Cucci .................... G01F 1/363 |
| | | | | 73/706 |
| 5,955,659 | A | | 9/1999 | Gupta et al. |
| 6,367,333 | B1 | * | 4/2002 | Bullister .............. A61B 5/0215 |
| | | | | 73/715 |
| 6,393,919 | B1 | * | 5/2002 | Ohji ...................... G01L 11/002 |
| | | | | 73/708 |
| 6,536,287 | B2 | * | 3/2003 | Beekhuizen .......... G01L 9/0075 |
| | | | | 73/718 |
| 7,096,738 | B2 | * | 8/2006 | Schumacher ........... G01F 1/383 |
| | | | | 73/718 |
| 7,637,152 | B2 | * | 12/2009 | Ushigusa .................. G01F 1/42 |
| | | | | 137/458 |
| 2005/0056097 | A1 | | 3/2005 | Banholzer et al. |
| 2016/0195415 | A1 | | 7/2016 | Lull |

\* cited by examiner

PRESSURE TYPE FLOWMETER

TECHNICAL FIELD

The present invention relates to a pressure type flowmeter.

BACKGROUND ART

As a pressure type flowmeter, there is one adapted to include a fluid resistance part in a flow path through which fluid flows, include pressure sensors respectively on the upstream and downstream sides of the fluid resistance part, and on the basis of the differential pressure between the upstream side pressure sensor and the downstream side pressure sensor, measure the flow rate of the fluid.

As the upstream and downstream side pressure sensors, capacitance type pressure sensors having the same configuration are respectively used. Each of the capacitance type pressure sensors is one adapted to measure absolute pressure by detecting a change in the capacitance between a diaphragm displaceable by pressure and a fixed electrode.

Specifically, the capacitance type pressure sensor includes: a main body part joined with the diaphragm; and the fixed electrode that is inserted into an electrode fixing hole formed in the main body part and provided with the fore end surface thereof facing the diaphragm, and includes a cylindrically-shaped guard electrode between the fixed electrode and the main body part to suppress floating capacitance from occurring between the fixed electrode and the main body part. In addition, the electrode fixing hole is provided with: a first sealing glass that insulates the fixed electrode and the guard electrode from each other as well as connecting them to each other; and a second sealing glass that insulates the guard electrode and the main body part from each other as well as connecting them to each other.

However, a gap is likely to occur between the guard electrode and the sealing glasses, and internal gas enclosed in an airtight reference chamber formed between the diaphragm and the fixed electrode may gradually leak through the gap to consequently prevent accurate pressure measurement. In the pressure type flowmeter adapted to measure a flow rate on the basis of the differential pressure between upstream side pressure and downstream side pressure, a change in the state of the airtight reference chamber of the upstream side pressure sensor and/or a change in the state of the airtight reference chamber of the downstream side pressure sensor cause a flow rate measurement error.

CITATION LIST

Patent Literature

Patent Literature 1: JP-A-2008-196858

SUMMARY OF INVENTION

Technical Problem

Therefore, the present invention is made in order to solve the above-described problem, and a main intended object thereof is to solve the problem occurring in a capacitance type pressure sensor adapted to measure absolute pressure and thereby reduce a flow rate measurement error.

Solution to Problem

That is, a pressure type flowmeter according to the present invention is a pressure type flowmeter adapted to include a fluid resistance part in a flow path through which fluid flows and measure a flow rate by detecting upstream side pressure and downstream side pressure of the fluid resistance part. In addition, a pressure sensor for detecting the upstream side pressure and a pressure sensor for detecting the downstream side pressure are capacitance type pressure sensors each of which is adapted to measure gauge pressure by detecting a change in capacitance between a diaphragm displaceable by pressure and a fixed electrode and has a main body part that supports the fixed electrode and the diaphragm and forms an internal space between them. Further, the internal space is opened to the atmosphere through a communicative connection part.

Since the pressure type flowmeter described above employs, as the upstream side pressure sensor and the downstream side pressure sensor, the capacitance type pressure sensors adapted to measure gauge pressures, respectively, the problem of external leakage occurring in a capacitance type pressure sensor adapted to measure absolute pressure can be solved. Note that since the internal space in the main body part supporting the fixed electrode and the diaphragm connects to the outside through the communicative connection part to thereby be opened to the atmosphere, the gauge pressure can be measured. In doing so, the pressure variation difference between the upstream side pressure sensor and the downstream side pressure sensor due to external leakage is prevented, and therefore the differential pressure between the respective pressure sensors can be accurately measured to thereby reduce a flow rate measurement error.

The main body part in the capacitance type pressure sensor is provided with the fixed electrode, a guard electrode, sealing glasses, and the like. In order to simply form the communicative connection part on the assumption of such a configuration, it is preferable that the communicative connection part is formed in the main body part.

It is preferable that the main body part and the diaphragm are joined together, an unjoined part is formed in a part between the main body part and the diaphragm, and the unjoined part forms the communicative connection part. This configuration eliminates the need to perform a special process for forming the communicative connection part in the main body part.

It is preferable that a groove is formed in a diaphragm joining surface of the main body part, and the groove forms the communicative connection part. This configuration only requires the formation of the groove in the diaphragm joining surface of the main body part, and allows the groove to form the communicative connection part in a state where the diaphragm is joined to the diaphragm joining surface, thus making it possible to simply form the communicative connection part.

Advantageous Effects of Invention

According to the present invention, the problem occurring in a capacitance type pressure sensor adapted to measure absolute pressure can be solved to thereby reduce a flow rate measurement error.

DESCRIPTION OF EMBODIMENTS

In the following, one embodiment of a pressure type flowmeter according to the present invention will be described with reference to the drawings.

A pressure type flowmeter 100 of the present embodiment is one used for, for example, a semiconductor manufacturing process, and a pressure type flowmeter adapted to include a fluid resistance part in a flow path through which fluid flows, and measure a flow rate by detecting the upstream and downstream side pressures of the fluid resistance part.

Figure 1:
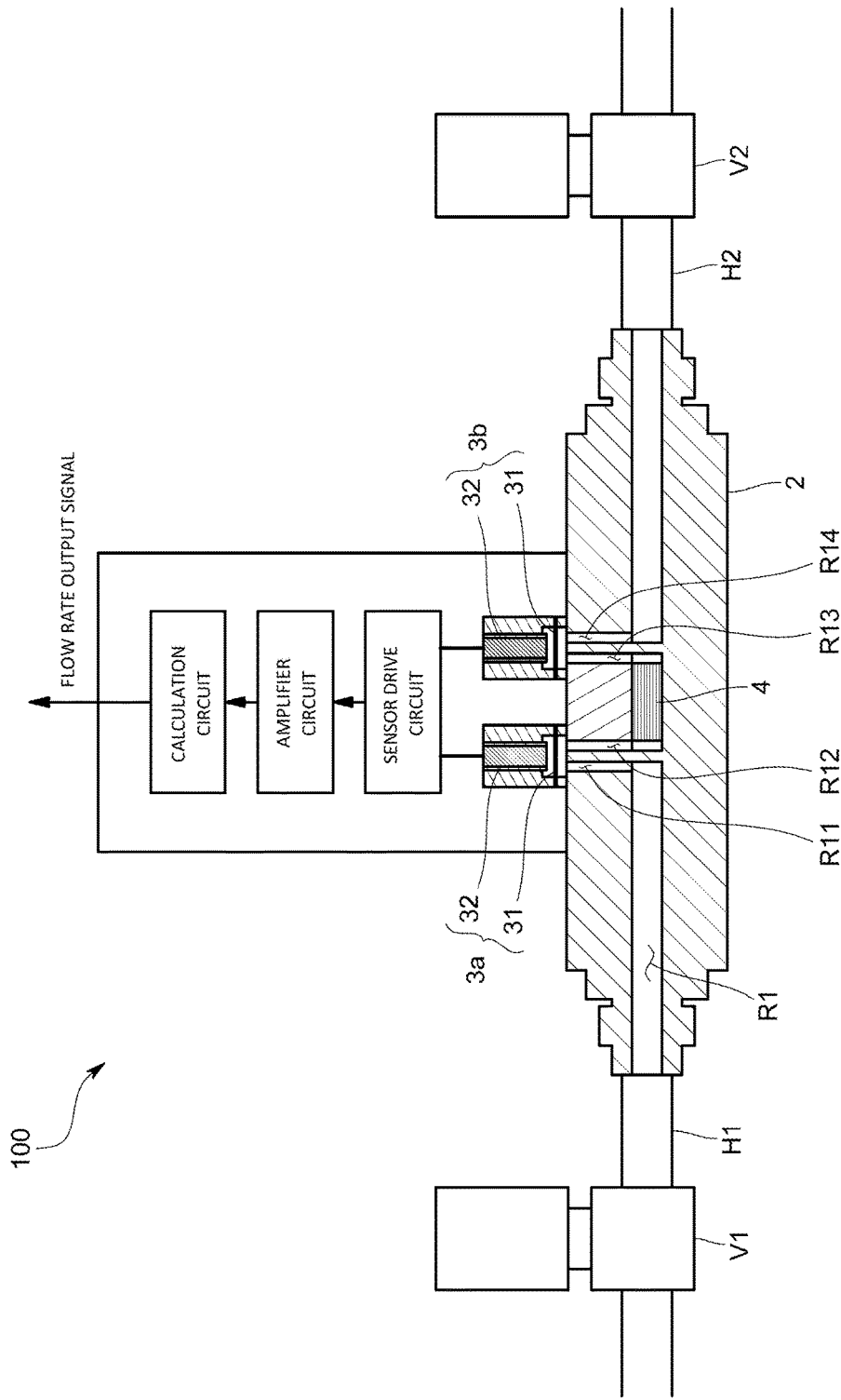
FIG. 1 is a cross-sectional view schematically illustrating the configuration of a pressure type flowmeter of the present embodiment.

Specifically, as illustrated in FIG. 1, the pressure type flowmeter 100 includes: a body unit 2 formed with a flow path R1 through which liquid such as semiconductor processing liquid flows; and an upstream side pressure sensor 3a adapted to sense pressure on the upstream side of the flow path R1 and a downstream side pressure sensor 3b adapted to sense pressure on the downstream side of the flow path R1, both of which are provided on the body unit 2. Note that the body unit 2 is formed of a material having corrosion resistance to the liquid, and for example, made of stainless steel. In addition, liquid contact members of the pressure sensors 3a and 3b, and the like are also formed of a material having corrosion resistance to the liquid, and for example, made of stainless steel.

The body unit 2 is a block-shaped unit through which the internal flow path R1 penetrates. In the middle of the internal flow path R1, a fluid resistance part 4 such as a laminar flow element or an orifice is provided. Also, one end part of the flow path on the upstream side of the body unit 2 is connected with an external inflow pipe H1. Similarly, the other end part of the flow path on the downstream side of the body unit 2 is connected with an external outflow pipe H2. Note that the external inflow and outflow pipes H1 and H2 are formed of a material having higher rigidity than the diaphragms 31 of the pressure sensors 3. In addition, the external inflow and outflow pipes H1 and H2 are provided with on-off valves V1 and V2, respectively, such as pneumatic valves or solenoid valves.

The upstream side pressure sensor 3a is provided on the upstream side of the fluid resistance part 4 and the downstream side pressure sensor 3b is provided on the downstream side of the fluid resistance part 4. The upstream side pressure sensor 3a is attached on the body unit 2 so as to cover the openings of upstream side introduction and lead-out paths R11 and R12 formed in the body unit 2. Also, the downstream side pressure sensor 3b is attached on the body unit 2 so as to cover the openings of downstream side introduction and lead-out paths R13 and R14 formed in the body unit 2. Any of the upstream side introduction and lead-out paths R11 and R12 and the downstream side introduction and lead-out paths R13 and R14 is formed so as to open in one surface of the body unit 2 near the fluid resistance part 4 in the internal flow path R1. Note that the upstream and downstream side pressure sensors 3a and 3b are driven by a sensor drive circuit, and detection signals obtained by the respective sensors 3a and 3b and indicating capacitances are amplified by an amplifier circuit and then converted into a flow rate by a calculation circuit.

Figure 2:
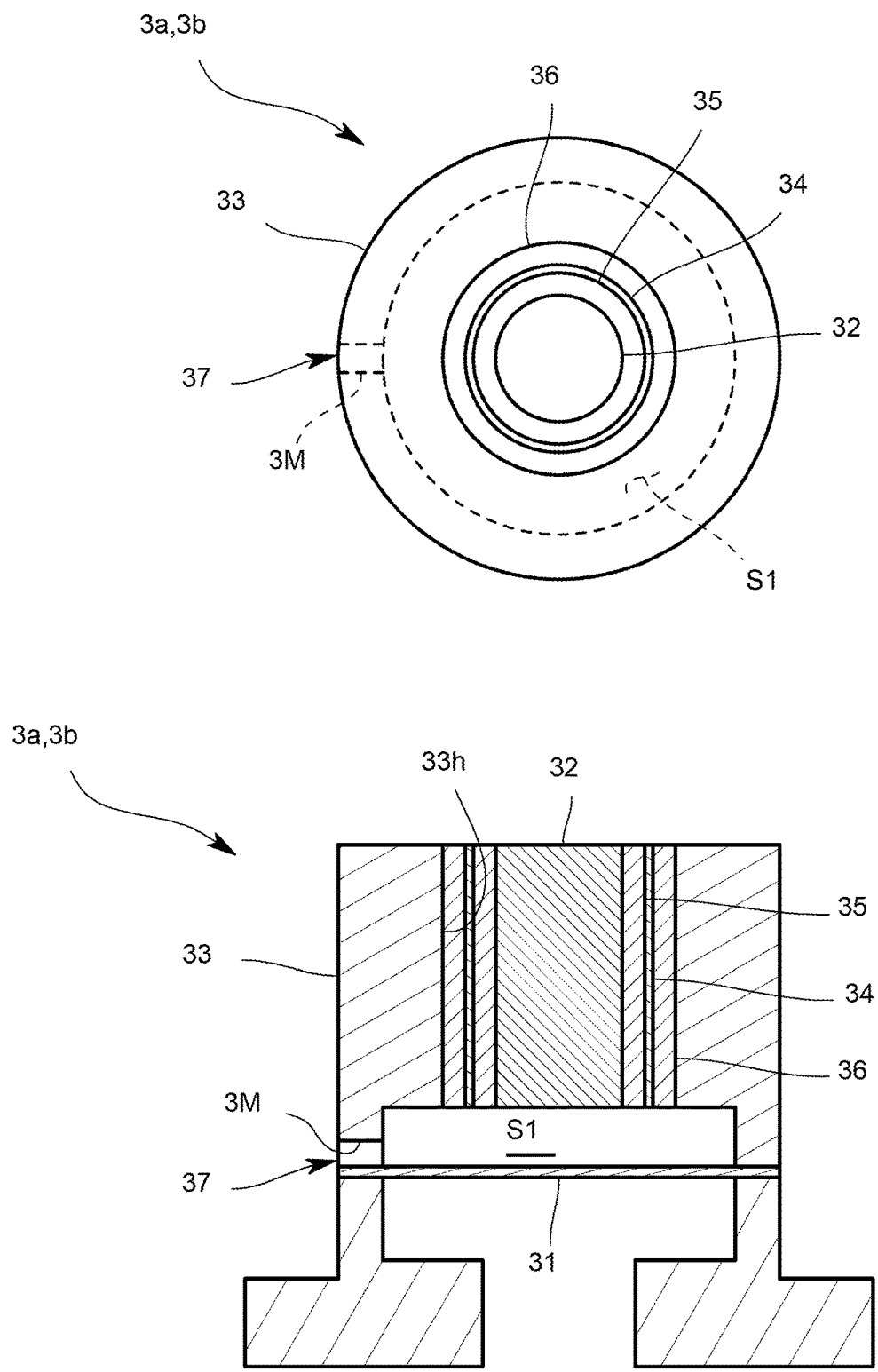
FIG. 2 is cross-sectional and plan views schematically illustrating the configuration of a capacitance type pressure sensor in the same embodiment.

Specifically, each of the pressure sensors 3a and 3b is one adapted to sense pressure using the diaphragm 31 deformable in response to a change in pressure in the flow path R1, and as illustrated in FIG. 2, a capacitance type pressure sensor adapted to measure the pressure by detecting the capacitance between the diaphragm 31 and a fixed electrode 32 provided separately from the diaphragm 31.

The capacitance type pressure sensor includes: a main body part 33 joined with the diaphragm 31; the fixed electrode 32 inserted into an electrode fixing hole 33h formed in the main body part 33 and provided with the fore end surface thereof facing the diaphragm 31; a cylindrically-shaped guard electrode 34 provided between the fixed electrode 32 and the main body part 33; a first sealing glass 35 provided between the fixed electrode 32 and the guard electrode 34 to insulate them from each other as well as connecting them to each other; and a second sealing glass 36 provided between the guard electrode 34 and the main body part 33 to insulate them from each other as well as connecting them to each other.

In addition, the capacitance type pressure sensor of the present embodiment is configured to be a gauge pressure sensor, and specifically, the internal space S1 formed between the diaphragm 31 and the fixed electrode 32 in the pressure sensor connects to a larger external space through a communicative connection part 37 to thereby be opened to the atmosphere, and is in an atmospheric pressure state. Note that the internal space S1 is formed by joining (e.g., welding) the diaphragm 31 to the circumferential edge surface (diaphragm joining surface) of a concave part formed in the main body part 33. In the present embodiment, the upstream and downstream side pressure sensors 3a and 3b connect to the common large external space through the corresponding communicative connection parts 37 to thereby be opened to the atmosphere.

The communicative connection part 37 in the present embodiment is formed in the main body part 33. Specifically, a groove 3M is formed along a radial direction in the diaphragm joining surface 33a of an annular shape of the main body part 33, and the groove 3M forms the communicative connection part 37.

The pressure type flowmeter 100 configured as described above employs, as the upstream and downstream side pressure sensors 3a and 3b, the capacitance type pressure sensors adapted to measure gauge pressures, respectively, and can therefore solve the problem of external leakage occurring in a capacitance type pressure sensor adapted to measure absolute temperatures. This prevents the pressure variation difference between the upstream and downstream side pressure sensors 3a and 3b due to external leakage, and therefore the differential pressure between the respective pressure sensors 3a and 3b can be accurately measured to thereby reduce a flow rate measurement error.

Also, since the groove 3M formed in the diaphragm joining surface 33a forms the communicative connection part 37, it is only necessary to perform groove processing on the diaphragm joining surface 33a of the main body part 33. Further, by joining the diaphragm 31 to the diaphragm joining surface 33a, the groove 3M forms the communicative connection part 37, and therefore the communicative connection part 37 can be easily formed.

Note that the present invention is not limited to the above-described embodiment.

Figure 3:
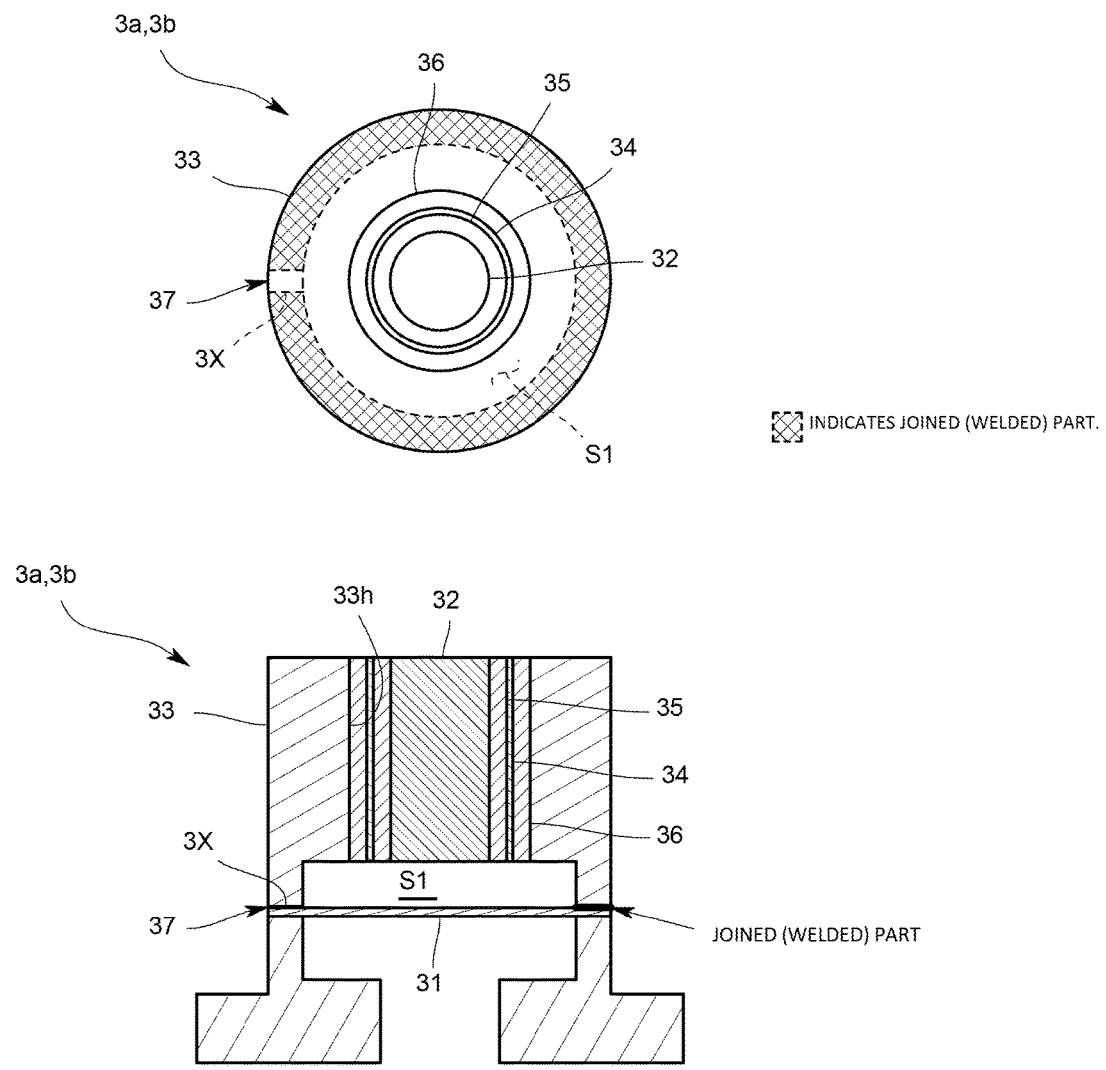
FIG. 3 is cross-sectional and plan views schematically illustrating the configuration of a capacitance type pressure sensor in a variation.

For example, as for the communicative connection part 37, as illustrated in FIG. 3, on the diaphragm joining surface 33a of the main body part 33, an unjoined part 3X may be formed in a part in the circumferential direction of the diaphragm joining surface 33a to thereby form the communicative connection part 37 communicatively connecting between the internal space S1 and the outside through the unjoined part 3X.

Figure 4:
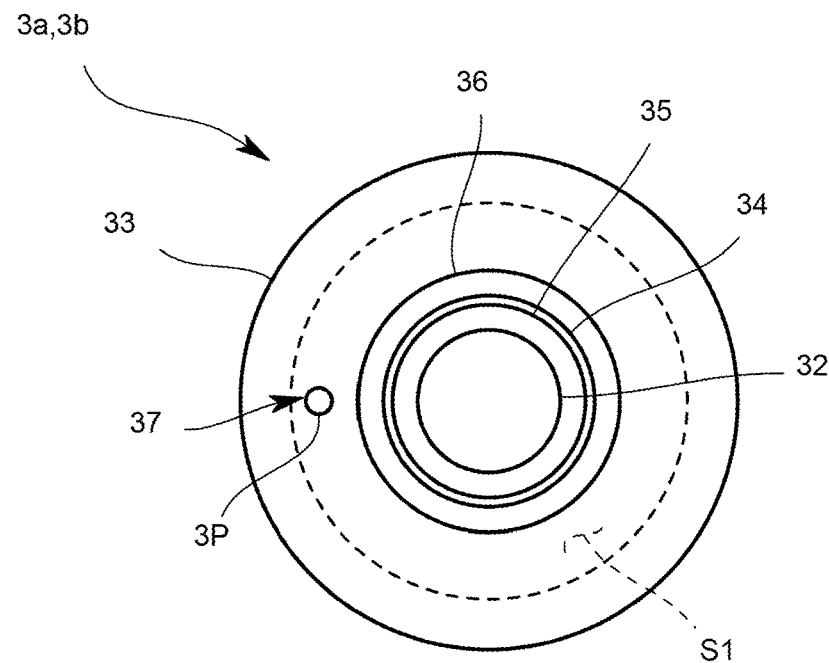
FIG. 4 is cross-sectional and plan views schematically illustrating the configuration of a capacitance type pressure sensor in another variation.
Figure 4:
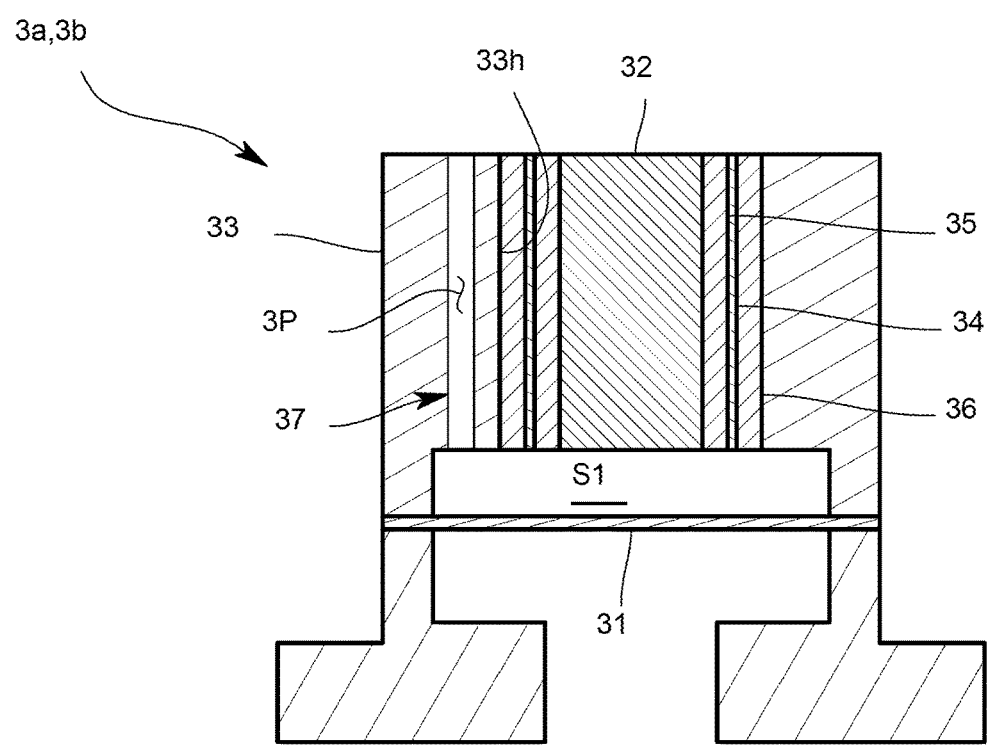

Also, as illustrated in FIG. 4, a communicative connection path 3P may be formed in the side wall of the main body part 33 to form the communicative connection part 37 communicatively connecting between the internal space S1 and the outside through the communicative connection path 3P. The communicative connection path 3P in FIG. 4 is one formed in a direction (in FIG. 4, the vertical direction) along the central axis of the fixed electrode 32 in the side wall of the main body part 33, but may be formed along, for example, a radial direction in the side wall located on the circumferentially outer side of the internal space S1.

Figure 5:
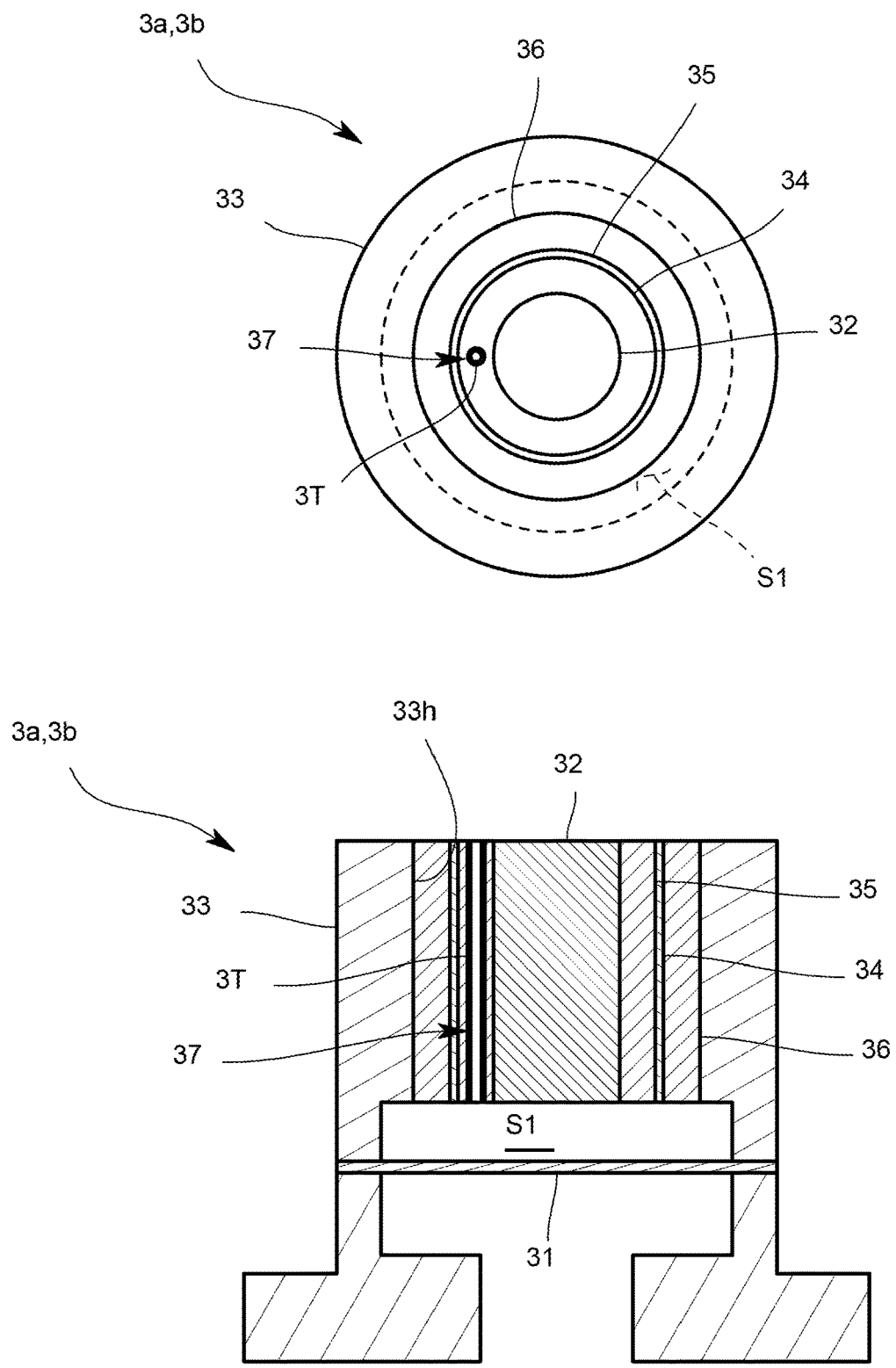
FIG. 5 is cross-sectional and plan views schematically illustrating the configuration of a capacitance type pressure sensor in still another variation.
Figure 6:
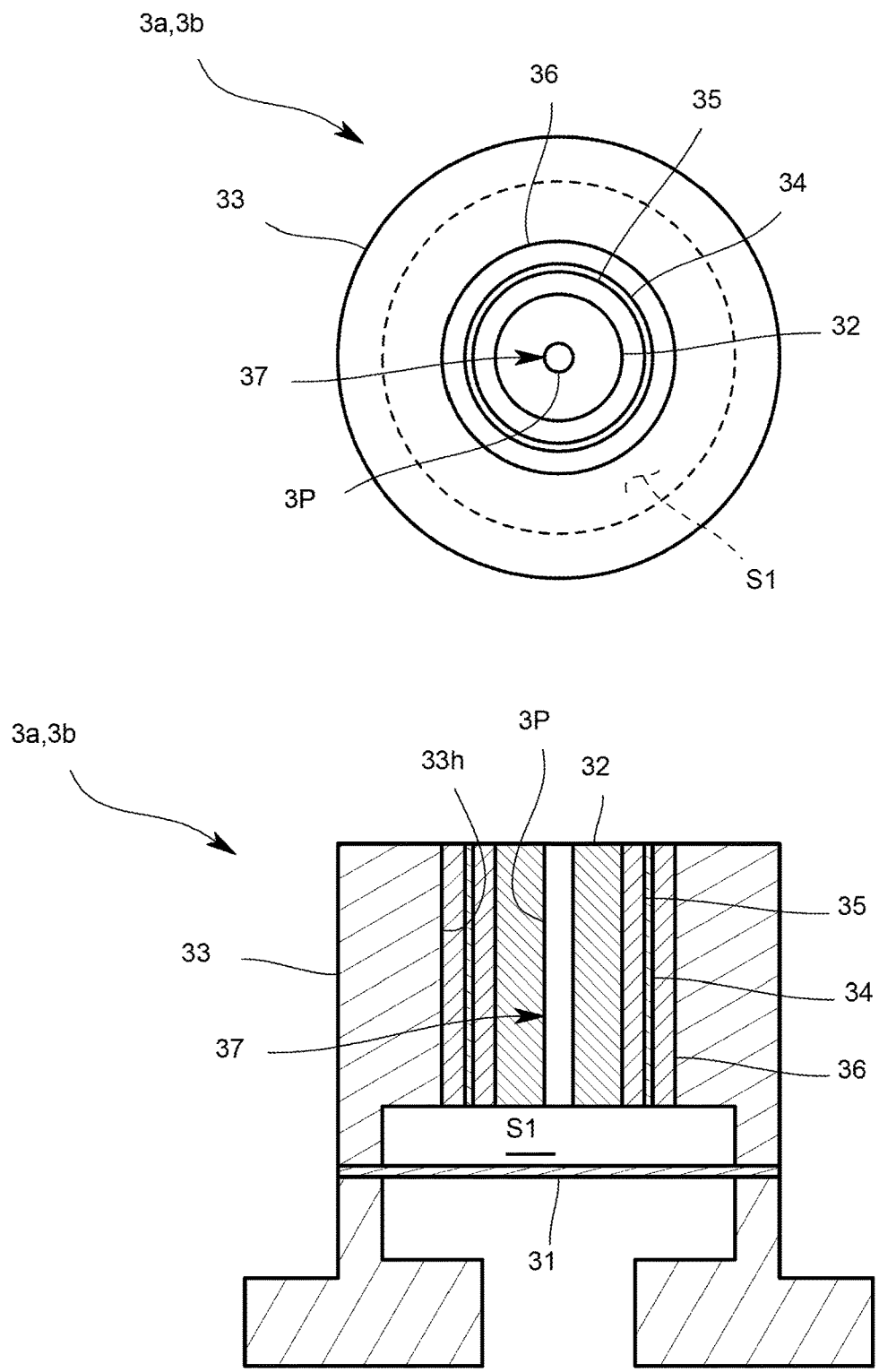
FIG. 6 is cross-sectional and plan views schematically illustrating the configuration of a capacitance type pressure sensor in yet another variation.

Further, as illustrated in FIG. 5, in addition to the formation in the main body part 33, the communicative connection part 37 may be formed in the sealing glass part by providing a pipe 3T for communicatively connecting between the internal space S1 and the outside when fusing the sealing glasses 35 and 36. Also, as illustrated in FIG. 6, a communicative connection path 3P for communicatively connecting between the internal space S1 and the outside may be formed along the axial direction in the central part of the fixed electrode 32.

In the above-described embodiment, described is the pressure type flowmeter adapted to measure a flow rate by detecting the upstream and downstream side pressures of the fluid resistance part; however, the present invention can also be applied to a flowmeter adapted to include an upstream side pressure sensor on the upstream side of a fluid resistance part, and measure a flow rate using pressure P detected by the upstream side pressure sensor. In this case, the upstream side pressure sensor is configured to be the same as the pressure sensor in the above-described embodiment. In this flowmeter, on the upstream side of the fluid resistance part, a temperature sensor adapted to detect the temperature of fluid is provided. Also, the fluid resistance part is an orifice or a nozzle. In this case, a calculation circuit of the flowmeter calculates the flow rate Q in accordance with Q=K×P (K represents a coefficient depending on the temperature of the fluid).

In the above-described embodiment, described is the pressure sensor of the pressure type flowmeter; however, the present invention may be applied to the pressure sensor itself.

The pressure type flowmeter of the above-described embodiment can also be used for purposes other than the semiconductor manufacturing process.

Besides, it should be appreciated that the present invention is not limited to any of the above-described embodiment and variations, but can be variously modified without departing from the scope thereof.

LIST OF REFERENCE CHARACTERS

100: Pressure type flowmeter
R1: Flow path
3a: Upstream side pressure sensor
3b: Downstream side pressure sensor
31: Diaphragm
32: Fixed electrode
33: Main body part
37: Communicative connection part
33a: Diaphragm joining surface
3M: Groove
3X: Unjoined part
4: Fluid resistance part

The invention claimed is:

1. A pressure type flowmeter adapted to include a fluid resistance part in a flow path through which fluid flows and measure a flow rate by detecting upstream side pressure and downstream side pressure of the fluid resistance part, wherein
an upstream pressure sensor for detecting the upstream side pressure and a downstream pressure sensor for detecting the downstream side pressure are capacitance type pressure sensors each of which is adapted to measure gauge pressure by detecting a change in capacitance between a diaphragm displaceable by pressure and a fixed electrode and has a main body part that supports the fixed electrode and the diaphragm and forms an internal space between them, and
the internal space of each pressure sensor is opened to an atmosphere through a communicative connection part.

2. The pressure type flowmeter according to claim 1, wherein
for each pressure sensor, the communicative connection part is formed in the main body part.

3. The pressure type flowmeter according to claim 1, wherein for each pressure sensor:
the main body part and the diaphragm are joined together, and
an unjoined part is formed in a part between the main body part and the diaphragm, and the unjoined part forms the communicative connection part.

4. The pressure type flowmeter according to claim 1, wherein
for each pressure sensor, a groove is formed in a diaphragm joining surface of the main body part, and the groove forms the communicative connection part.

5. The pressure type flowmeter according to claim 1, wherein
the internal space of the upstream pressure sensor and the internal space of the downstream pressure sensor connect to a common external space through the respective communicative connection parts to thereby be opened to the atmosphere.

* * * * *